United States Patent [19]

Atkins et al.

[11] Patent Number: 5,930,420
[45] Date of Patent: Jul. 27, 1999

[54] METHOD FOR PRODUCING PHOTO INDUCED GRATING DEVICES BY UV IRRADIATION OF HEAT-ACTIVATED HYDROGENATED GLASS

[75] Inventors: Robert Michael Atkins, Millington; Rolando Patricio Espindola, West Orange, both of N.J.

[73] Assignee: Lucent Technologies, Inc., Murray Hill, N.J.

[21] Appl. No.: 08/912,261

[22] Filed: Aug. 15, 1997

[51] Int. Cl.⁶ .................................................. G02B 6/34
[52] U.S. Cl. .............................. 385/37; 65/384; 430/290
[58] Field of Search ............................... 65/384; 385/37; 359/566; 430/290

[56] References Cited

U.S. PATENT DOCUMENTS 5,235,659  8/1993  Atkins et al. .......................... 385/124
5,478,371  12/1995  Lemaire et al. .......................... 65/384
5,745,617  4/1998  Starodubov et al. ...................... 385/37

Primary Examiner—John D. Lee
Assistant Examiner—Juliana K. Kang
Attorney, Agent, or Firm—Mathews, Collins, Shepherd & Gould, P.A.

[57] ABSTRACT

In accordance with the invention, the index of refraction of a region of a glass body is selectively increased by treating the glass with hydrogen or deuterium, heating the hydrogenated glass to a temperature in excess of 500° C., permitting the glass to rapidly cool below 100° C. and exposing the region to UV radiation, preferably in the range 300 nm to 400 nm. The result is an increase in the refractive index of the irradiated region. Absorption is via a GODC band at 330 nm believed to result from a singlet to triplet transition. This band is about 1000 times weaker than the commonly used band at 240 nm. This process can be used to make and adjust a variety of optical waveguide devices such as photoinduced Bragg gratings and long period gratings.

16 Claims, 2 Drawing Sheets

METHOD FOR PRODUCING PHOTO INDUCED GRATING DEVICES BY UV IRRADIATION OF HEAT-ACTIVATED HYDROGENATED GLASS

FIELD OF THE INVENTION

The present invention relates to methods for making photo induced gratings.

BACKGROUND OF THE INVENTION

Photoinduced gratings are passive components of particular utility in optical fiber telecommunications systems. In essence, gratings are lengths of optical waveguide, such as optical fiber, in which periodic variations of the refractive index have been induced. When closely spaced, these periodic variations act as a Bragg grating and selectively reflect light having a wavelength of twice the spacing. When widely spaced, the variations act as a long period grating and can shift light in a first guided mode to a second guided mode or even to a non-guided mode. Such gratings can be used to filter, to define laser cavities, and to multiplex or demultiplex transmitted light.

Photoinduced gratings have been made in a variety of ways. An early approach was to form a reflecting surface on a short length of germanium glass optical fiber and to transmit a strong infrared laser beam down the fiber to set up a periodic interference pattern. Index perturbations form at the maximum intensities. See U.S. Pat. No. 4,474,427 issued to Kenneth O. Hill, et al which is incorporated herein by reference. A second approach is to direct two interfering beams of ultraviolet (UV) radiation through the cladding of an optical fiber to form an interference pattern along a germanium-doped glass core. See, for example, U.S. Pat. No. 4,725,110 issued to Glenn, et al which is incorporated herein by reference. A third technique is to subject periodic regions of a fiber core to UV radiation, as through an amplitude mask. See U.S. Pat. No. 5,104,209 issued to K. O. Hill, et al which is incorporated herein by reference. And yet another approach involves exposure of a fiber through a phase mask. See U.S. Pat. No. 5,327,515 issued to D. Z. Anderson, et al which is incorporated herein by reference.

U.S. Pat. No. 5,287,427 issued to P. J. Lemaire, et al. discloses that the index-changing effect of UV radiation can be enhanced by treating the glass with hydrogen or deuterium, and that in hydrogen or deuterium-treated glass (hereinafter generically referred to as hydrogenated glass) the index of refraction can be increased not only by UV radiation, but also by the application of heat.

U.S. Pat. No. 5,478,371 issued to P. J. Lemaire, et al. further discloses that the index of refraction of a glass region can be selectively increased by hydrogenating the glass and then simultaneously applying heat and UV radiation to the region.

A difficulty with the known techniques for making photo induced fiber gratings is that they typically require deep UV lasers which are highly expensive and difficult to control. Current grating writing takes place in the deep UV, at wavelengths between 190 and 260 nm. This is because fibers are most sensitive to UV in this spectral region because of absorption by germanium-oxygen deficiency centers (GODCs) at 240 nm.

Lasers in the deep UV region fall into three main classes: excimer lasers, excimer-pumped dye lasers and frequency-doubled argon ion lasers. All are expensive and difficult to use and align. In addition, the excimer lasers most commonly used to write gratings have poor beam quality and low coherence.

If gratings could be written using UV in the mid-UV region, at wavelengths in the range 300 nm to 400 nm and preferably 320–365 nm, then lasers such as argon ion lasers operating at 351 nm could be utilized. These lasers are simple, reliable, inexpensive, and have excellent beam quality and high coherence. He—Cd lasers at 325 nm could also be used although at lower power. Accordingly there is a need for an improved method of writing gratings which is operable using mid-UV lasers.

SUMMARY OF THE INVENTION

In accordance with the invention, the index of refraction of a region of a glass body is selectively increased by treating the glass with hydrogen or deuterium, heating the hydrogenated glass to a temperature in excess of 500° C., permitting the glass to rapidly cool below 100° C. and exposing the region to UV radiation, preferably in the range 300 nm to 400 nm. The result is an increase in the refractive index of the irradiated region.

Absorption is via a GODC band at 330 nm believed to result from a singlet to triplet transition. This band is about 1000 times weaker than the commonly used band at 240 nm. This process can be used to make and adjust a variety of optical waveguide devices such as photoinduced Bragg gratings and long period gratings.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, and are not to scale.

DETAILED DESCRIPTION

Figure 1:
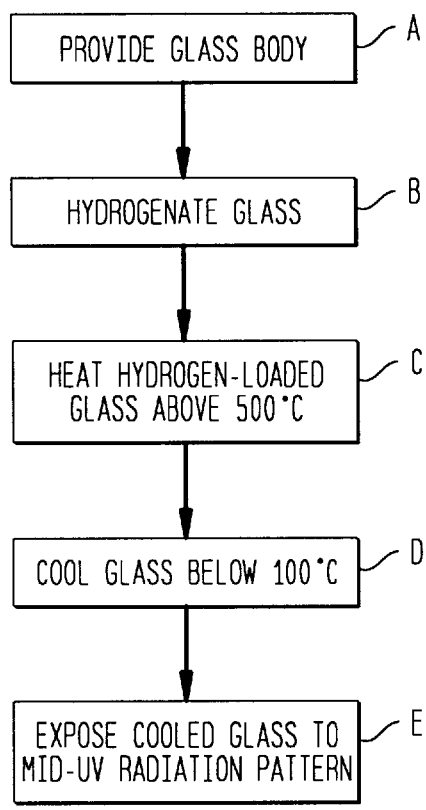
FIG. 1 is a block diagram showing the steps of an exemplary process for increasing the index of refraction of local regions a glass body.

Referring to the drawings, FIG. 1 illustrates the steps of an exemplary process for increasing the index of refraction of a local region of a glass body.

Figure 2:
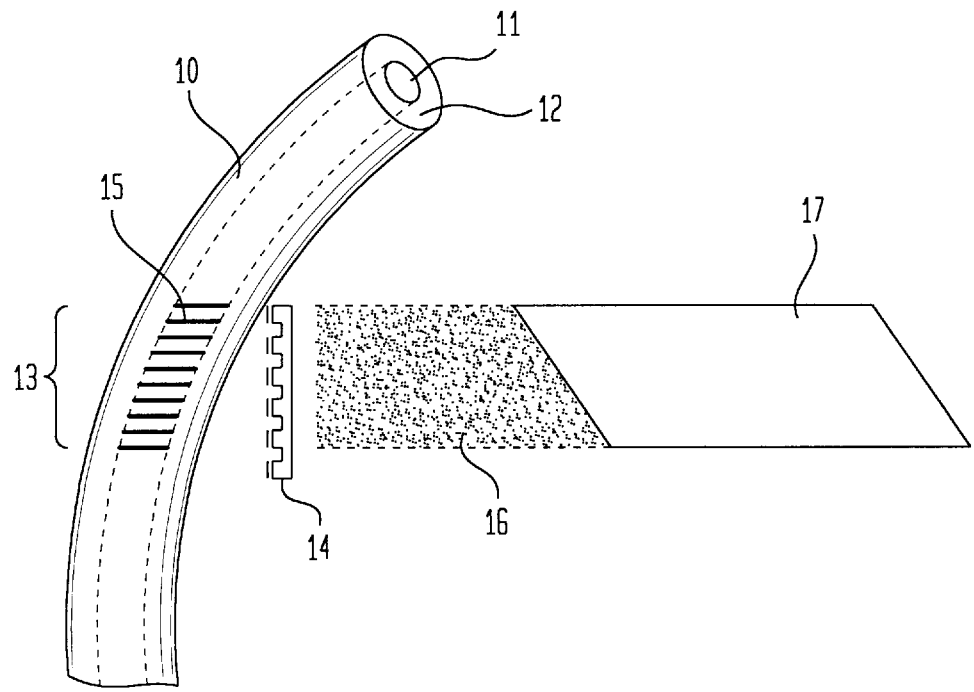
FIGS. 2 and 3 illustrate glass bodies upon which the process of FIG. 1 can be used.
Figure 3:
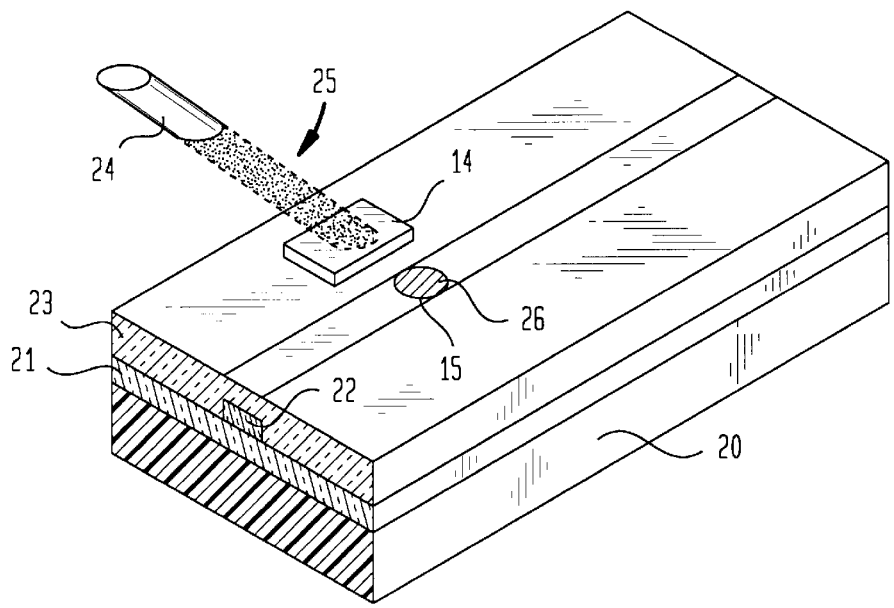

As shown in Block A, the first step is to provide a body of glass. The body can be any of a wide variety of forms. Forms particularly preferred for this process are illustrated in FIGS. 2 and 3. They include optical fiber (FIG. 2) and substrate-supported thin layers (FIG. 3). Preferably the glass is a transparent glass doped with a photosensitive material such as germanium doped silica or phosphorus doped silica. Typical $GeO_2$ concentrations in silica are in the range 3–20 mole % $GeO_2$, with higher index changes observed for higher $GeO_2$, concentrations. Typical $P_2O_5$ concentrations in silica are in the range 3–10 mole %.

The next step shown in Block B is to diffuse hydrogen (or deuterium) into the glass body in at least those regions whose refractive index is to be increased. Preferably this diffusion is effected by exposing the body to hydrogen or deuterium gas at a pressure in the range 14–11,000 p.s.i. Advantageously, the diffusion takes place at low to moderate temperatures in the range 21°–250° C.

Diffusion times depend on the temperature and the thickness of the glass to be lie loaded. Typical diffusion times for standard sized optical fibers vary from about 12 days at 21° C. to about 10 hours at 100° C. More generally, the time required for the $H_2$ loading of a fiber of radius r is directly proportional to $r^2$ and inversely proportional to the difffusivity of $H_2$ in the glass.

Since the radiation induced reactions usually occur only at localized portions of the glass body, it is possible to make use of $H_2$ that can diffuse from surrounding areas. For example, for a single mode fiber a significant amount of $H_2$ can diffuse from the cladding material into the $GeO_2$ doped core, thus permitting maximum index changes to be achieved in the core even though the $H_2$ concentration may be less than the $GeO_2$ concentration. It is believed that the pertinent reaction involves at least one H atom per Ge atom. In fabrication, the amount of loaded hydrogen at equilibrium varies jointly with the pressure of hydrogen and jointly with an exponential factor:

$$\exp\left[\frac{2.07 \text{ kcal/mole}}{RT}\right].$$

The third step shown in Block C is to heat activate the hydrogen-loaded glass. Preferably the glass is heated rapidly to a temperature in excess of 500° C. and even more preferably to a temperature in excess of 800° C. The glass body is preferably heated by infrared radiation from a $CO_2$ laser. The heating can be general or local. The heating of the glass to these temperatures in the presence of hydrogen or deuterium is believed to form UV-absorbing defects.

The next step (Block D) is to cool the body (or permit the body to cool) to a temperature below 100° C. and preferably to room temperature. The heating and cooling should be rapid in order to minimize the loss of hydrogen from the fiber. The presence of hydrogen along with the defects produced by heat activation of the hydrogen-loaded glass greatly enhance the photosensitivity of the glass. Ideally, heating and cooling are sufficiently rapid that minimal hydrogen diffuses out of the glass. In practice, a body heated in excess of 500° C. should be above 500° C. for 10–15 s and should be cooled below 100° C. within a minute. A body heated in excess of 800° C. should be above 800° C. for 0.5–1.0 s and should be cooled below 100° C. within 10 s. The preferred method uses rapid heating of a fiber with a $CO_2$ laser to a temperatures of about 10000 C for less than one second followed by rapid cooling in air. This procedure retains a significant fraction (more than one-quarter, preferably more than one-half) of the initial $H_2$ or $D_2$ initially loaded into the fiber.

After cooling the heat-activated hydrogenated glass, the final step (Block E) is to apply UV radiation to the regions whose refractive index is to be increased. While deep UV radiation on the order of 240 nm can be used, the preferred application of the invention is to permit the use of mid-UV radiation in the range 300–400 nm and preferably 320–365 nm. The mid-TV radiation is preferably from an argon ion laser.

The preferred application of the invention is for increasing the refractive index of selected portions of glass fiber or a glass layer to form or modify optical waveguide properties. An optical waveguide typically comprises an elongated glass structure including a core of relatively high refractive index glass and a cladding of lower refractive index glass at least partially surrounding the core. The dimensions of the core are chosen and adapted for transmitting in the longitudinal direction electromagnetic radiagtion of optical wavelength typically in the range 0.8 to 1.7 micrometers. FIG. 2 illustrates such a waveguiding body in the form of an optical fiber 10 having a cylindrical core 11 surrounded by a concentric cladding 12, For communications fibers, the core is typically germanium-doped silica. A convenient way of applying heat to a region 13 of said fiber is to apply infrared radiation 16 from a line-focused $CO_2$ laser (not shown).

In a preferred application, the mid-UV radiation is applied from a UV source 17 to A cooled, activated region 13 in a pattern with periodic intensity peaks 15 to form a photo induced grating. Such patterned exposure can be achieved by use of a phase mask 14 as described in the aforementioned '515 patent. Alternatively, an amplitude mask or interfering beams can be used to write the grating peaks.

FIG. 3 illustrates a waveguiding body in planar form, typically comprising a substrate 20, a thin base (cladding) layer 21 disposed upon the substrate, a core glass layer 22 on the cladding and a top cladding layer 23. Planar waveguides for communications applications typically have phosphorus-doped silica cores but can utilize germania-doped cores. Further details of conventional planar waveguides are described in C. H. Henry, et al., "Glass Waveguides On Silicon For Hybrid Optical Packaging", 7 J. Lightwave Technol., pp. 1530–39 (1989) which is incorporated herein by reference. Typically, all but a thin stripe of the core layer is etched away prior to application of the top cladding in order to define the waveguide region.

A convenient way to heat selected regions of a planar waveguide structure is to direct a $CO_2$ laser (not shown) to apply infrared radiation onto a portion 26 of the structure. In a preferred application, the UV radiation 25 is applied from source 24 through mask 14 to the cooled, activated region 26 in a pattern with intensity peaks 15 to form a photo induced grating.

The operations and applications of the invention can be better understood by consideration of the following example.

EXAMPLE 1

Writing of Gratings

Figure 4:
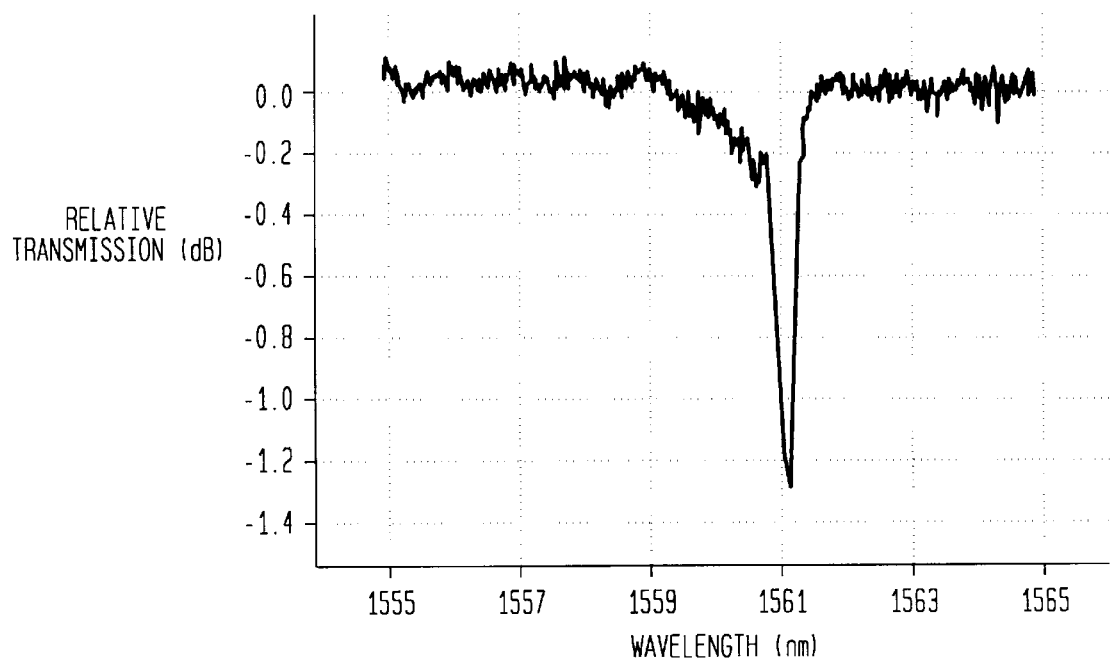
FIGS. 4 is a graphical illustration showing the transmission spectrum of a grating made by the process of FIG. 1.

To maximize grating writing potential we chose a high germania fiber (10 mole % $GeO_2$) and hydrogen loaded it to about 2.8 mole % hydrogen. The region in which the grating was to be written was then subjected to brief (<1 second) heating using a $CO_2$ laser. This raised the temperature of the fiber sufficiently to cause a reaction between dissolved hydrogen and the $GeO_2$ in the glass to form a large number of GODCs, as well as OH groups. We estimate the GODC absorption at 240 nm to have been of the order of 2000 dB/mm. The heating was brief enough that a significant amount of hydrogen remained in the fiber. Grating writing was then performed using the focused 351 nm line from an Argon ion laser in conjunction with a phase mask. The estimated power density at the fiber was 250 W/cm². FIG. 4 shows the transmission spectrum of a grating which was written in 12 minutes. The estimated index change for this grating was around $2 \times 10^{-4}$.

While not necessary for the invention, applicants' best current understanding of the theory of the invention is that when $GeO_2$ is heated to 500–1000+° C. in the presence of hydrogen, a reaction takes place resulting in the formation of reduced germania centers (GODCs). These centers absorb strongly in the UV near 240 nm and weakly near 330 nm. If the GODC level is high, interaction with mid-UV light (300–400 nm) can be sufficient to cause a photoinduced change in refractive index—a change which is greatly amplified in the presence of $H_2/D_2$. If heating and cooling are done rapidly (0–10 seconds and preferably about 1 second) $H_2$ or $D_2$ does not have time to substantially diffuse out of the fiber. Thus photosensitivity is enhanced in two ways: first, by the heat-activation in the presence of $H_2/D_2$ which forms UV absorbing defects; and, second, by the retention of $H_2/D_2$ in the glass which amplifies photosensitivity.

It is to be understood that the above-described embodiments are illustratrative of only a few of the many possible specific embodiments which can represent applications of the principles of the invention. Numerous and varied other arrangements can be readily devised by those skilled in the art without departing from the spirit and scope of the invention.

We claim:

1. A method for increasing the index of refraction of selected portions of a glass body comprising the steps of:

providing a body comprising glass;

diffusing hydrogen or deuterium into at least selected portions of said glass body;

heating at least said selected portions to a temperature in excess of 500° C;

cooling said portions to a temperature less than 100° C.; and exposing said selected portions to ultraviolet radiation to increase the index of refraction.

2. The method of claim 1 wherein said ultraviolet radiation is radiation in the wavelength range 300–400 nm.

3. The method of claim 1 wherein said ultraviolet radiation is radiation in the wavelength range 320–365 nm.

4. The method of claim 1 wherein said glass body is an optical fiber.

5. The method of claim 1 wherein said glass body is a planar optical waveguide.

6. The method of claim 1 wherein said diffusing is by exposing said glass to said hydrogen or deuterium at a pressure in the range of 14–11,000 p.s.i.

7. The method of claim 1 wherein said glass body comprises silica doped with $GeO_2$.

8. The method of claim 1 wherein said exposing to ultraviolet radiation is exposing to a sequence of spaced intensity peaks to define a grating.

9. The method of claim 1 wherein said heating is by application of infrared radiation.

10. The method of claim 1 wherein said heating is by the application of a $CO_2$ laser.

11. The method of claim 1 wherein said exposing is by application of an argon ion laser.

12. The method of claim 1 wherein said exposing is by application of a He—Cd laser.

13. The method of claim 1 wherein said selected portions are heated to a temperature in excess of 800° C.

14. The method of claim 1 wherein said selected portions are heated to a temperature of at least 500° C. and are cooled to a temperature less than 100° C. in 1 minute or less.

15. The method of claim 1 wherein said selected portions are heated to a temperature of at least 800° C. and are cooled to a temperature less than 100° C. in 10 seconds or less.

16. The method of claim 1 wherein said cooling is sufficiently rapid to retain at least one-fourth of the hydrogen or deuterium diffused into said portions.

* * * * *